United States Patent [19]

Borkar et al.

[11] Patent Number: 4,782,439
[45] Date of Patent: Nov. 1, 1988

[54] DIRECT MEMORY ACCESS SYSTEM FOR MICROCONTROLLER

[75] Inventors: Shekhar Borkar, Portland, Oreg.; Martin Pawloski; James White, both of Gilbert, Ariz.

[73] Assignee: Intel Corporation, Santa Clara, Calif.

[21] Appl. No.: 15,799

[22] Filed: Feb. 17, 1987

[51] Int. Cl.⁴ ............................................ G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,067,059 | 1/1978 | Derchak | 364/200 |
| 4,479,179 | 10/1984 | Dinwiddie, Jr. | 364/200 |
| 4,558,412 | 12/1985 | Inoshita et al. | 364/200 |
| 4,658,350 | 4/1987 | Eggebrecht et al. | 364/200 |
| 4,688,166 | 8/1987 | Schneider | 364/200 |

Primary Examiner—Eddie P. Chan
Attorney, Agent, or Firm—Blakely, Sokoloff, Taylor & Zafman

[57] ABSTRACT

The present invention is directed to a pair of on-board DMA channels for use in connection with a single integrated circuit microcontroller. The two DMA channels, which are identical to one another, allow high speed data transfer from one variable memory space to another. As many as 64 Kbytes can be transferred in a single DMA operation. The memory transfer can be between internal data memory, external data memory and/or special function registers (of the type commonly employed in INTEL 8051 microcontrollers).

4 Claims, 4 Drawing Sheets

DIRECT MEMORY ACCESS SYSTEM FOR MICROCONTROLLER

BACKGROUND OF THE INVENTION

Direct Memory Access (DMA) is an interface that provides for transfer of data directly to and from random access memory (RAM) and a peripheral device, i.e. without using the processor or its registers. In general, the processor initializes the DMA channel by sending a memory address and the number of words to be transferred. The actual transfer of data is done directly between the peripheral unit and the memory unit through the DMA, freeing the processor for other tasks.

FIG. 1 is a block diagram which shows the relationship of a DMA channel among other components in a microcomputer system. The processor communicates with the DMA channel through the address and data buses as with any I/O interface unit. The DMA has its own address which activates the chips select (CS) and register select (RS) input lines. The processor initializes the DMA channel through the data bus by transferring the starting address and word (or byte) count to appropriate DMA registers. The processor then sends a control byte to inform the DMA to start the data transfer. When the peripheral unit sends a DMA request, the DMA channel activates its bus request (BR) line, informing the processor to release the buses. The processor responds with its bus granted (BG) line informing the DMA channel that the buses have been relinquished. The DMA channel then places the current value of its address register on the address bus, initiates a read (RD) or write (WR) signal, and sends a DMA acknowledge through the peripheral unit. When the peripheral unit receives the DMA acknowledge, it puts a word (or byte) on the data bus (for a write) or receives a word (or byte) from the data bus (for a read). Thus, the DMA channel controls the read or write operation and supplies the address in RAM. The peripheral unit can then communicate with the RAM through the data bus for direct transfer between the peripheral unit and the RAM while the microprocessor is momentarily disabled. The transfer can be made for an entire block of bytes, suspending the processor operation until the whole block is transferred, or the transfer can be made one byte at a time in between microprocessor instruction execution. Once the DMA channel stops transferring data, it disables its BR signal, which disables the BG signal in the processor, returning control of the buses to the processor.

SUMMARY OF THE INVENTION

The present invention is directed to a pair of on-board DMA channels for use in connection with a single integrated circuit microcontroller. The two DMA channels, which are identical to one another, allow high speed data transfer from one variable memory space to another. As many as 64 Kbytes can be transferred in a single DMA operation. The memory transfer can be between internal data memory, external data memory and/or special function registers (of the type commonly employed in INTEL 8051 microcontrollers).

The DMA channels are software programmable to operate in either block mode or demand mode. In block mode, DMA transfers can be further programmed to take place in burst mode or alternate cycle mode. In burst mode, the processor halts its execution and dedicates its resources towards the DMA transfer. In alternate cycle mode, the DMA cycles and processor instruction cycles occur alternately.

DETAILED DESCRIPTION OF THE INVENTION

Figure 1:
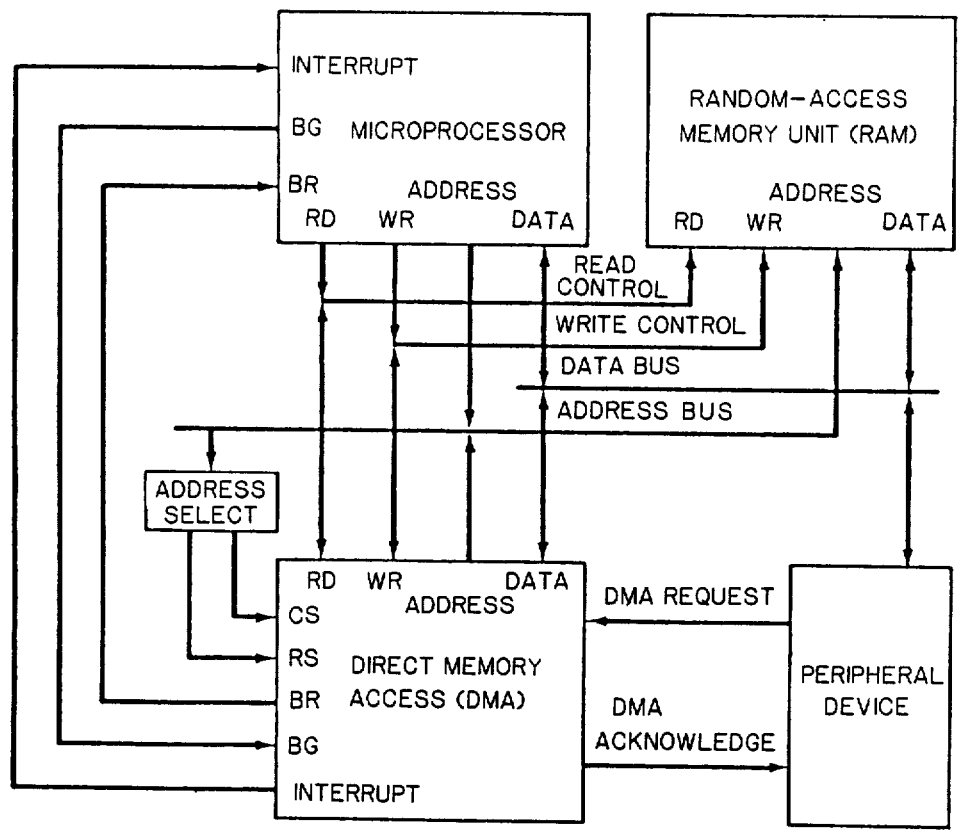
FIG. 1 is a block diagram of a prior art DMA channel.

In the following description, various references are made to the pins of the microcontroller in conjunction with which the invention has been implemented. The terminology employed is consistant with the INTEL 8051 microcontroller as described in the "Microcontroller Handbook", Order No. 210918-004 available from Intel Corporation. In this connection, as an aid to the understanding of the persent invention, all the pinouts of the microcontroller are set forth in Table 1.

TABLE 1

| Pin Name | Description |
| --- | --- |
| VSS | Circuit potential. |
| VCC | Supply voltage during normal, idle, and power down operation. |
| XTAL1 | Input ot an inverting oscillator amplifier. Also serves as the input for an external clock signal. |
| XTAL2 | Output from an oscillator amplifier. |
| Port 0 | Port 0 is an 8-bit open drain bi-directional I/O port. Port 0 pins that have 1s written to them float and in that state can be used as high-impedance inputs. Port 0 is also a multiplexed low-order address and data bus during accesses to external program and data memory by both the CPU and the DMA channels. |
| Port 1 | Port 1 is an 8-bit bi-directional I/O Port with internal pullups. Port 1 pins that have 1s written to them are pulled high by the internal pullups, and in that state can be used as inputs. Port 1 also has the following special functions and for the special functions to operate a "1" has to be written to the indicated pin first. |

| Pin | Alternate Function |
| --- | --- |
| 0 | Global Serial Channel (GSC) receiver data input |
| 1 | GSC transmitter data output |
| 2 | Drive Enable to enable external drivers |
| 3 | GSC external transmit clock input |
| 4 | GSC external receive clock input |
| 5 | DMA hold request |
| 6 | DMA hold acknowledge |
| 7 | none |
| Port 2 | Port 2 is an 8-bit bi-directional I/O port with internal pullups. Port 2 pins that have 1s written to them are pulled high by the internal pullups, and in that state can be used as inputs. Port 2 is also a high order address |

TABLE 1-continued

| | bus during accesses to external program and data memory by both the CPU and DMA channels. |
|---|---|
| Port 3 | Port 3 is an 8-bit bi-directional I/O port with internal pullups. Port 3 pins that have 1s written to them are pulled high by the internal pullups, and in that state can be used as inputs. Port 3 also has the following special functions and for the special functions to operate the indicated pin must be programmed to a "1" first. |

| Pin | Alternate Function |
|---|---|
| 0 | Local Serial Channel (LSC) serial data input port |
| 1 | LSC serial data output port |
| 2 | INT0 external interrupt 0 |
| 3 | INT1 external interrupt 1 |
| 4 | T0 Timer 0 external input |
| 5 | T1 Timer 1 external input |
| 6 | WR external data memory write strobe |
| 7 | RD external data memory read strobe |
| Port 4 | Port 4 is an 8-bit bi-directional I/O port with internal pullups. Port 4 pins that have 1s written to them are pulled high by the internal pullups, and in that state can be used as inputs. |
| $\overline{\text{RESET}}$ | Reset input. A low level on this pin for two machine cycles while the oscillator is running resets the device. |
| $\overline{\text{EA}}$ | External Access enable. $\overline{\text{EA}}$ must be externally held low in order to enable the device to fetch code from external Program Memory locations 0000H to 1FFFH. |
| ALE | Address Latch Enable output pulse for latching the low byte of the address during accesses to external memory. In normal operation ALE is emitted at a constant rate of 1/6 of the oscillator frequency, and may be used for external timing or clocking purposes. Note, however, that one ALE pulse is skipped during each access to external Data Memory. |
| $\overline{\text{PSEN}}$ | Program Store Enable is the read strobe to external Program Memory. When the processor is executing code from external Program Memory, $\overline{\text{PSEN}}$ is activated twice each machine cycle, except that two $\overline{\text{PSEN}}$ activations are skipped during each access to external Data Memory. |

Figure 2A:
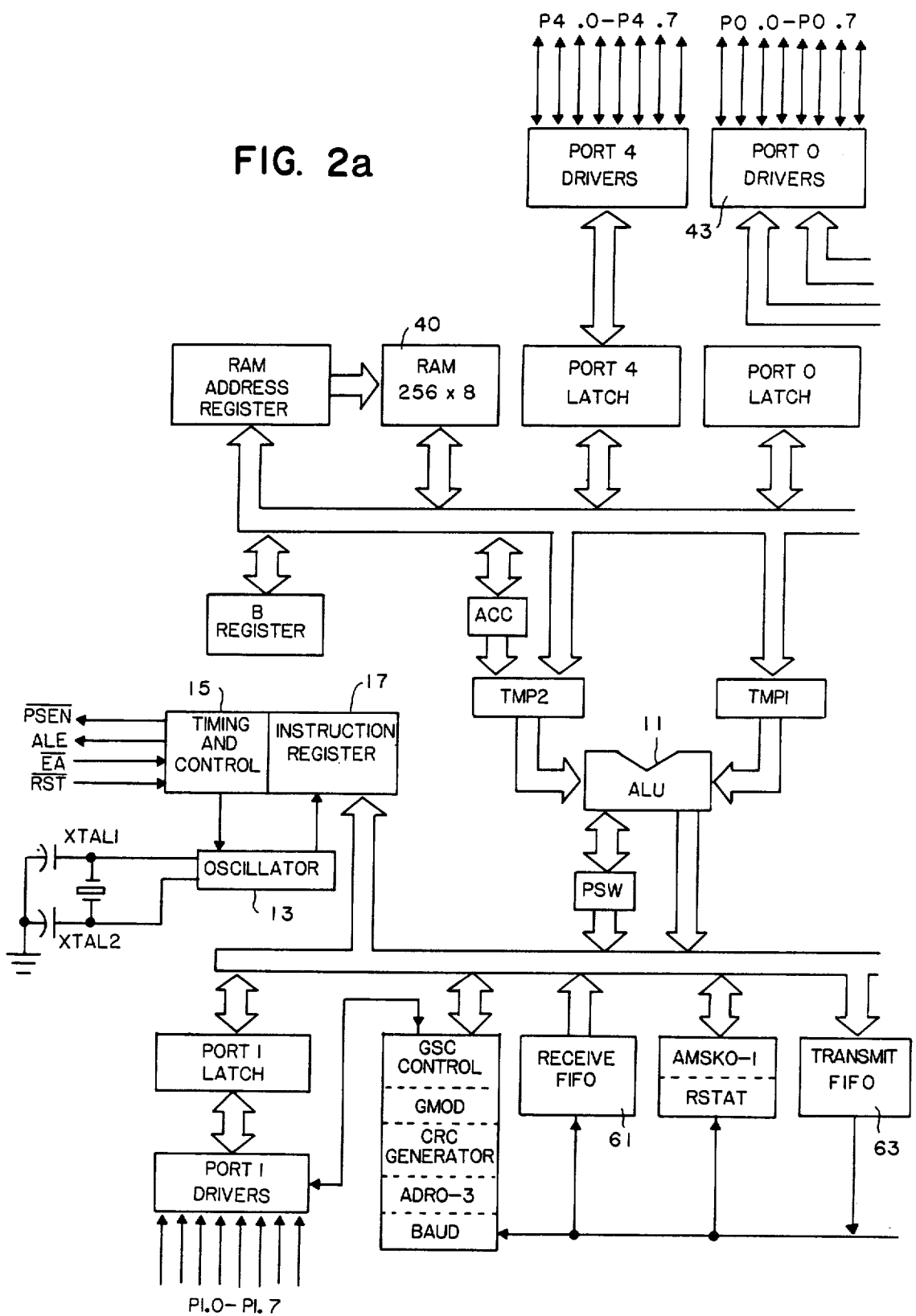
FIG. 2 is a block diagram of the microcontroller in conjunction with which the DMA channels of the present invention have been implemented.
Figure 2B:
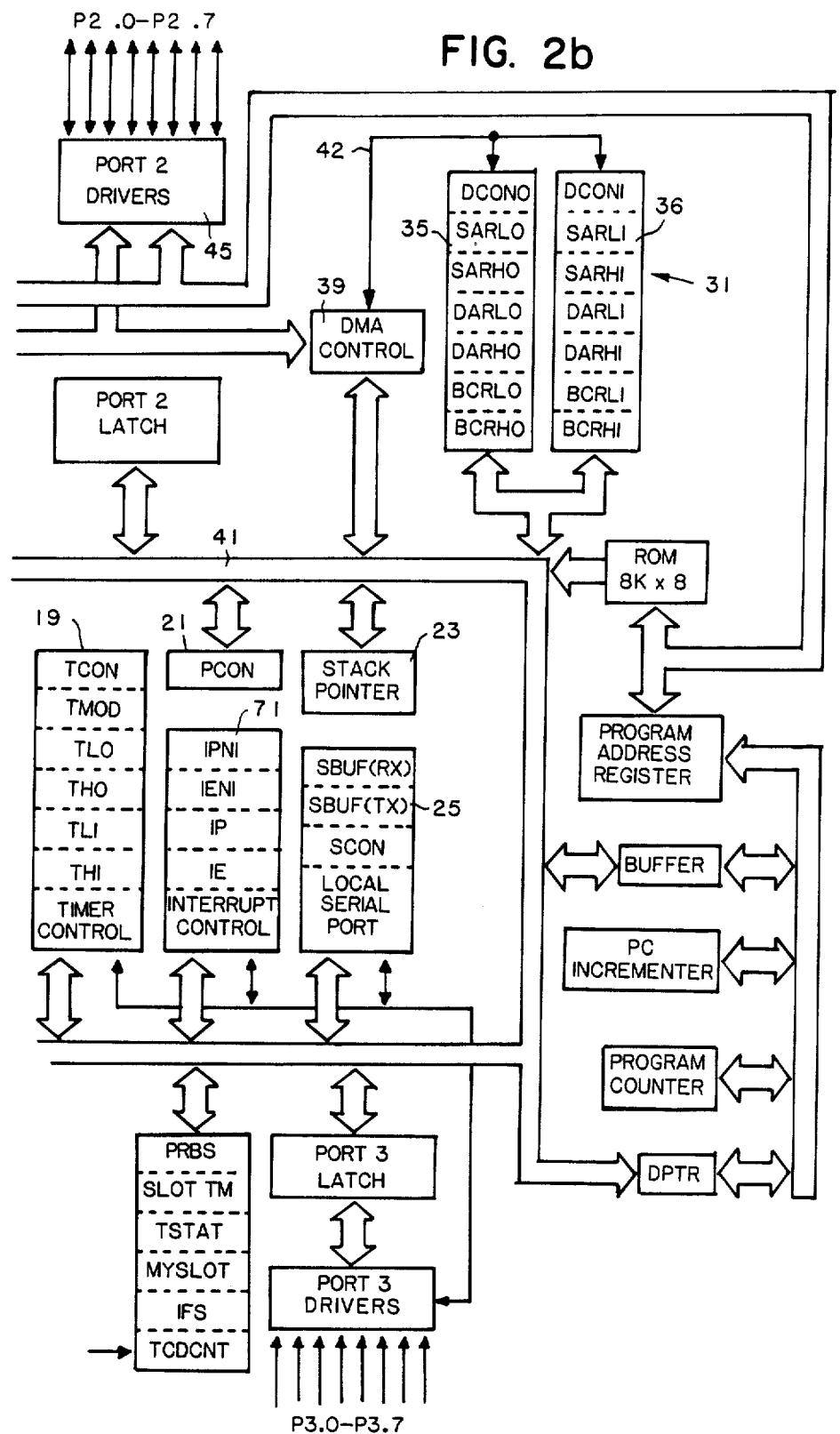

FIG. 2 is a block diagram illustrating the microcontroller in conjunction with which the invented DMA channels have been implemented. Many of the illustrated components are common to microcontroller architecture in general, and specifically the INTEL 8051 microcontroller. Accordingly, except where necessary for an understanding of the present invention, components such as the arithmetic-logical unit (ALU) 11 and its registers ACC, TMP1, TMP2 and PSW, oscillator 13, timing and control block 15, instruction register 17, timer control 19, power control register (PCON) 21, stack pointer 23, local serial port 25 and the like will not be described herein.

The present invention is implemented utilizing three 16-bit registers and one 8-bit register for each DMA channel. In the following description of the DMA channels, the DMA channels are designated as DMA0, DMA1 and their corresponding registers are suffixed by 0 or 1 respectively; e.g. SAR0, DAR1, etc. The three 16-bit registers are a source address register (SAR or SAR0 for DMA channel 0 and SAR1 for DMA channel 1) which points to the source byte to be transferred; the destination address register (DAR or DAR0 for DMA channel 0 and DAR1 for DMA channel 1) which points to the address of the byte to which the transfer is to be made; and the byte count register (BCR or BCR0 for DMA channel 0 and BCR 1 for DMA channel 1 which contains the number of bytes to be transferred). The BCR is decremented as each byte is transferred from the address pointed to by the SAR to the address pointed to by the DAR. As shown in FIG. 1, the aforesaid DMA registers 31 are in two blocks 35 and 36 where the SAR, DAR and BCR are each shown as two eight bit registers, SARL0, SARH0, SARL1, SARH1, DARL0, DARH0, DARL1, DARH1, BCRL0, BCRH0, BCRL1 and BCRH1.

The 8-bit register is the DMA control register (DCON) which determines the source address memory space, the destination address memory space and the mode of operation of the DMA channel. The following sets forth the meanings of the various bits in the DMA control register. As noted above, for each DMA channel there is a DMA control register referred to herein as DCON0 and DCON1.

The 8 bits or flags in each DCON register are:

DAS    IDA    SAS    ISA    DM    TM    DONE    GO

The functionality of each bit is described below DAS specifies the Destination Address Space. If DAS=0, the destination is in external data memory. If DAS=1 and IDA=0, the destination is a Special Function Register (SFR). If DAS=1 and IDA=1, the destination is in internal data RAM 40. IDA specifies the Increment Destination Address. If IDA=1, the destination address is automatically incremented after each byte transfer. If IDA=0, it is not. In auto increment mode, the source address and/or destination address is incremented when a byte is transeerred.

SAS specifies the Source Address Space. If SAS=0, the source is in external data memory. If SAS=1 and ISA=0, the source is an SFR. If SAS=1 and ISA=1, the source is internal data RAM 40.

ISA specifies the Increment Source Address. If ISA=1, the source address is automatically incremented after each byte transfer. If ISA=0, it is not.

DM specifies the Demand Mode. If DM=1, the DMA Channel operates in Demand Mode. In Demand Mode the DMA is initiated either by an external signal or by a serial port flag as described below, depending on the value of the TM bit. If DM=0, the DMA is requested by setting the GO bit in software.

TM specifies the Transfer Mode. If DM=1 then TM selects whether a DMA is initiated by an external signal (TM=1) or by a serial port flag (TM=0). If DM=0 then TM selects whether the data transfers are to be in bursts (TM=1) or in alternate cycles (TM=0).

DONE indicates the completion of a DMA operation and flags an interrupt. It is set to 1 by on-chip hardware when BCR=0, and is cleared to 0 by on-chip hardware when its corresponding interrupt is serviced. It can also be set or cleared by software.

GO is the enable bit for the DMA Channel itself. The DMA channel is inactive if GO=0.

In addition to the two DCON registers, two additional flags may be utilized when a shared external data bus is used by two or more processors. Specifically, in the INTEL 8051 microcontroller, a power control or PCON register is utilized. In the PCON register bit positions five and six are assigned as the REQ and ARB flags respectively.

ARB enables the DMA logic to detect $\overline{\text{HLD}}$ and generate $\overline{\text{HLDA}}$. $\overline{\text{HLD}}$ is a signal generated by an external device when the channel requests use of an external bus and $\overline{\text{HLDA}}$ is a signal generated by the DMA logic which indicates to the external device that the processor will not begin a new DMA to or from external data memory as long as $\overline{\text{HLD}}$ is asserted. This logic is disabled when ARB=0, and enabled when ARB=1.

REQ enables the DMA logic to generate $\overline{\text{HLD}}$ and detect $\overline{\text{HLDA}}$ before performing a DMA to or from external data memory. After it has activated $\overline{\text{HLD}}$, the processor will not begin the DMA until $\overline{\text{HLDA}}$ is seen to be active. This logic is disabled when REQ=0, and enabled when REQ=1. A more detailed description of ARB and REQ is set forth below.

Figure 3:
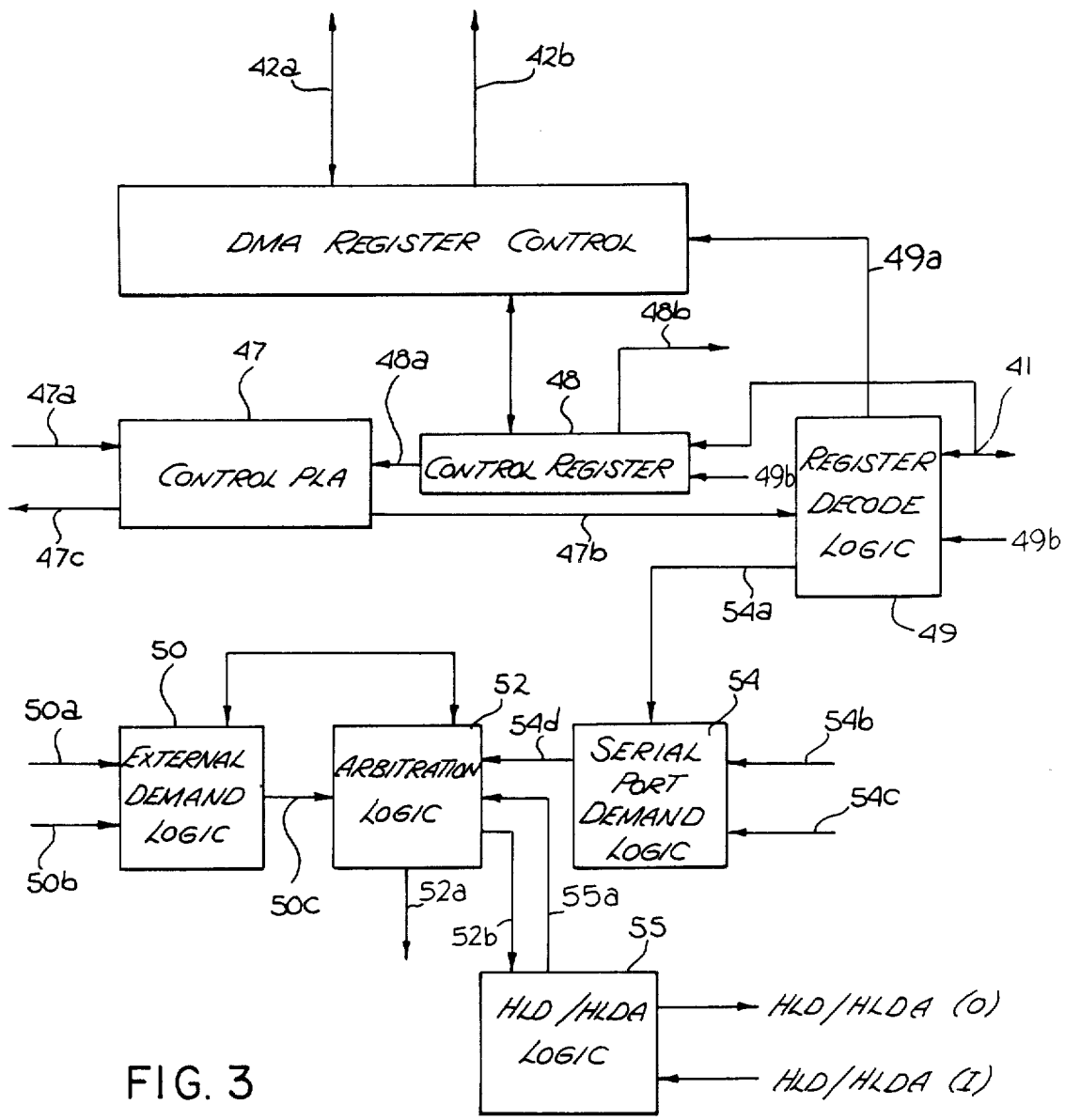
FIG. 3 is a detailed block diagram showing the DMA channels of the present invention.
Figure 4:
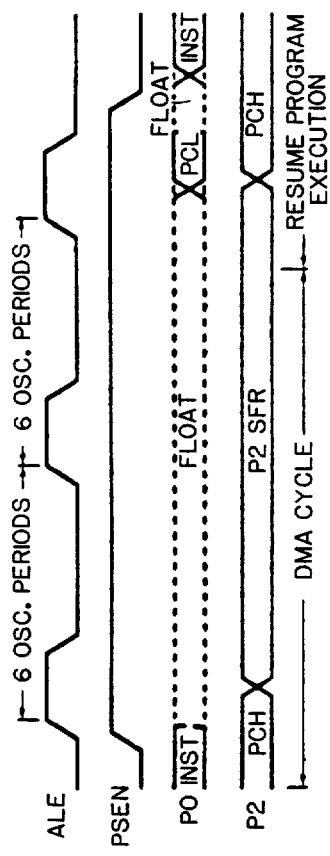
FIG. 4 is a timing diagram for an internal memory or special function register to internal memory or special function register DMA cycle.
Figure 5:
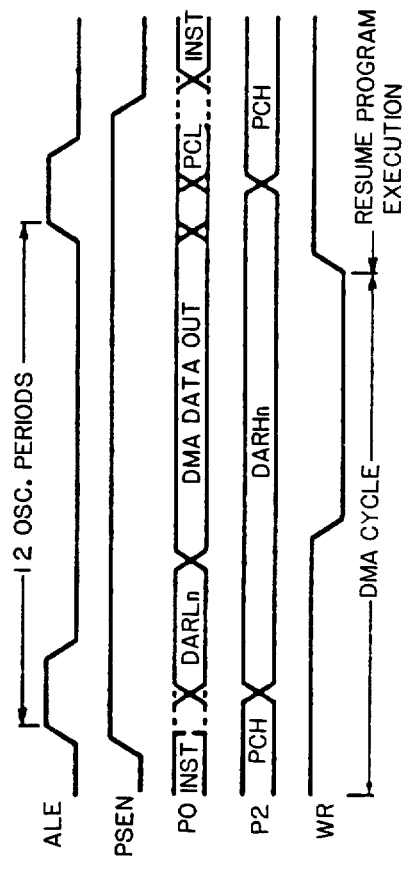
FIG. 5 is a timing diagram for an internal memory or special function register to external memory DMA cycle.
Figure 6:
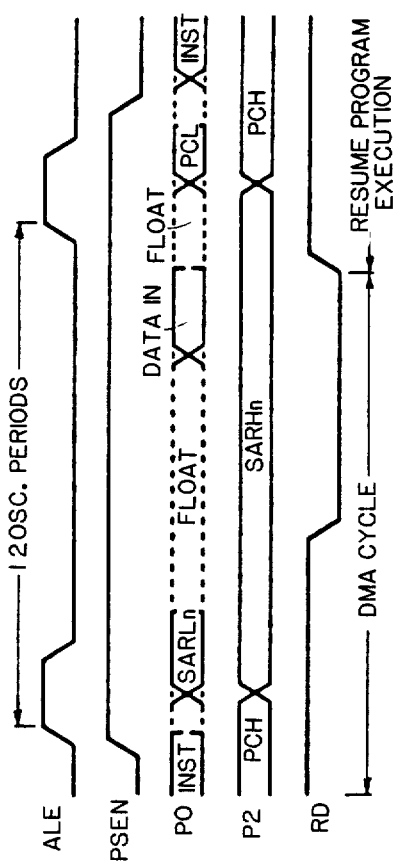
FIG. 6 is a timing diagram for an external memory to internal memory or special function register DMA Cycle.
Figure 7:
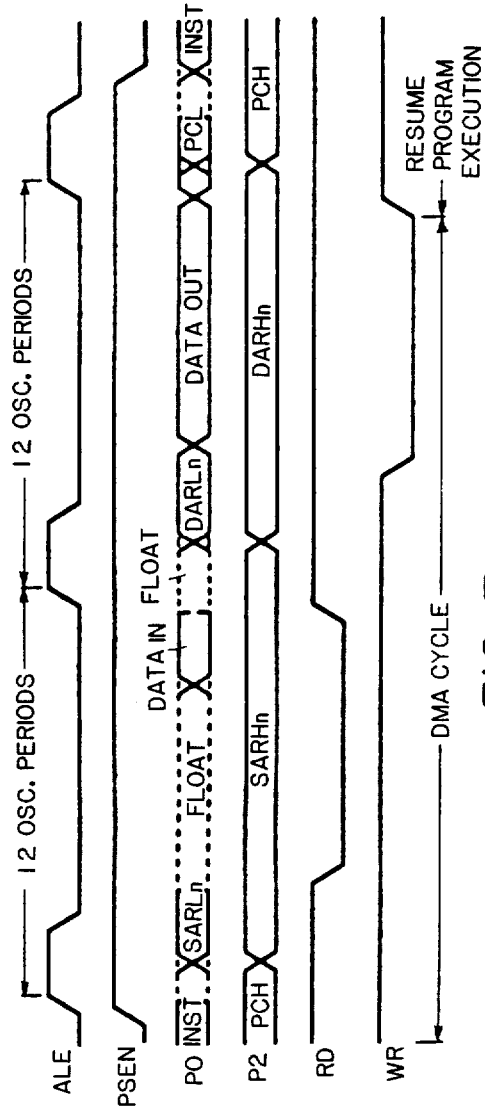
FIG. 7 is a timing diagram for an external memory to external memory DMA cycle.

Details of DMA control block 39 will now be described with reference to FIG. 3.

DMA control block 39 comprises DMA register control 46 which generates channel control signals on line 42b to the DMA registers in blocks 35 and 36. Additionally, the status of the BCR0 and BCR1 in blocks 35 and 36 are controlled by data from the BCRs through line 42a. Timing signals are input into the DMA control block 39 through control PLA 47 on line 47a. The control PLA generates control signals on line 47c which along with a signal on line 52a inhibit the microcontroller while a DMA is in progress. Also generated on line 47c are signals which access internal RAM 40 and special function registers, or which access external memory using port 0 and port 2 through port 0 and port 2 drivers 43 and 45, respectively. Based upon the timing and mode bits received from control register 48 on line 48a, control PLA 47 also generates DMA register select signals on line 47b which are input into register decode logic 49. Control register 48 also asserts interrupt signals through signals on line 48b which are coupled to interrupt control logic 71. Register decode logic 49 multiplexes CPU and DMA register read, write and select signals on line 49b to allow access of the DMA registers in blocks 35 and 36 by the CPU or the DMA depending upon which is presently active.

Mode bits from the currently active DMA channel are placed on line 48b from DMA control register 48 into external demand logic 50 and arbitration logic 52. Based upon the setting of the mode bits, and the setting of edge or level mode on line 50a and INT0 or INT1 on line 50b, line 50c is asserted indicating to arbitration logic 52 that a DMA request from an external source has been made. Serial port demand logic 54 receives a signal on line 54a from register decode logic 49 indicating whether the global serial channel or local serial channel has been selected. line 54b is asserted and input into serial port demand logic 54 when a local serial channel request has been made and line 54c is asserted and input into a serial demand logic 54 when a global serial channel request has been made and described below. A signal on line 54d from serial port demand logic 54 indicates to arbitration logic 52 when a serial port request has been made and a global or local serial channel has been selected. Arbitration logic 52 utilizes the foregoing inputs to determine whether an instruction cycle should take place (whether it takes 1,2 or 4 machine cycles), whether a DMA0 cycle should take place or a DMA1 cycle should take place regardless of whether the DMA cycle takes one or two machine cycles, according to the following rules:

If HLD/HLDA logic 55 is disabled (ARB=0, REQ=0):

A write to any DMA address or control register is always followed by an instruction cycle.

A DMA0 cycle is called for if GO0=1 and any of the following conditions are satisfied:
1. Channel 0 burst mode is selected;
2. Channel 0 is in serial channel demand mode and a serial channel demand flag is up. However, a serial channel demand mode DMA cycle in which the destination address is TFIFO will not be generated unless the previous cycle was an instruction cycle.
3. Channel 0 is in external demand mode and an external demand flag is up;
4. Channel 0 is in alternate cycles mode and Channel 1 is not, and the previous cycle was not a DMA cycle;
5. Channel 0 and Channel 1 are both in alternate cycles mode, and the previous cycle was not a DMA cycle, and the previous DMA cycle was not a DMA0 cycle.

A DMA1 cycle is called for if GO1=1 and no condition for DMA0 cycle is satisfied, and any of the following conditions are satisfied:
1. Channel 1 Burst Mode is selected;
2. Channel 1 is in serial channel demand mode and a serial channel demand flag is up as described below (a serial channel demand mode DMA cycle in which the destination address is TFIFO will not be generated unless the previous cycle was an instruction cycle);
3. Channel 1 is in external demand mode and an external demand flag is up;
4. Channel 1 is in alternate cycles mode and Channel 0 is not, and the previous cycle was not a DMA cycle;
5. Channel 1 and Channel 0 are both in alternate cycles mode, and the previous cycle was not a DMA cycle, and the previous DMA cycle was not a DMA 1 cycle.

If a DMA cycle is not called for, then an instruction cycle is executed.

Any time conditions are satisfied for a DMA0 cycle, the DMA0 cycle will be executed, even if the DMA1 channel is active. That is not to say a DMA1 cycle will be interrupted once it has begun. However, once a cycle has begun, be it an instruction cycle or DMA cycle, it will be completed without interruption.

If $\overline{\text{HLDHLDA}}$ logic 55 is not disabled (either ARB=1 or REQ=1), then the Hold/Hold Acknowledge protocol will also be observed, as described below, for DMAs to or from external RAM. Whenever a DMA channel is active, arbitration logic 52 asserts line 52a which is coupled to the other logic blocks in DMA control block 39 as well as to the microcontroller.

DMA Operation

When a DMA transfer is complete, i.e. when BCR equals 0, the DONE bit is set and a maskable interrupt is generated and placed on bus 41 by interrupt control logic 71 in FIG. 2. Under software control, the GO bit is set to start the DMA transfer.

The GO bit must be set for a DMA operation in any mode to occur. If the GO bit is not set, all modes are disabled.

When configured in burst transfer mode, DMA0 or DMA1 is initiated by setting the GO bit in its DCON register. In this mode, program execution is suspended and DMA operation continues until BCR=0 and then generates an interrupt (if enabled). DMA operation, once started, cannot be interrupted. A discussion of the interrupt scheme of the processor as it relates to DMA is described below.

Alternate cycle mode is also initiated by setting the GO bit in the DCON0 or DCON1 register. Following the instruction that sets the GO bit, one more instruction is executed, then the first data byte is transferred from the SAR address to the DAR address, and then another instruction is executed. In this mode, a DMA cycle and an instruction cycle occur alternately. The interrupt request is generated (if enabled) at the end of the process, i.e. when BCR=0, the hardware clears the GO bit and sets the DONE bit generating on interrupt, if enabled.

The DMA channels may be initiated by an external device via INT0 and INT1 pins (Port 3, pins 2 and 3 respectively). A logic 1 on the INT0 pin demands DMA0 whereas a logic 1 on the INT1 pin demands DMA1 and the DMA transfer is initiated if the GO bit is set. If the interrupts are configured in the edge mode of operation, a single byte transfer is accomplished for every request. Edge mode operation also causes an interrupt (INT0 or INT1) after every byte transfer if the interrupts corresponding to INT0 and INT1 pins respectively are enabled. If the interrupts are configured in the level mode of operation, the DMA transfer continues until the request is unasserted or BCR=0. In either case, a DMA interrupt is generated (if enabled) when BCR=0. (Edge/level mode of operation is determined by the setting of flag IT1 in the timer/control register TCON which is part of timer control block 19. When IT1=1 edge mode is specified and when IT1=0, level mode is specified.)

In both demand modes, the initial request is latched on the falling edge of state 5 phase 2 of the system clock. To begin a DMA transfer, the request or INT0 or INT1 must be asserted before this edge, allowing a set up time for the signal to become valid. If the request is latched on the last cycle of an instruction, the DMA transfer begins following the next instruction. Otherwise, the DMA transfer begins following the last cycle of the current instruction.

In edge mode, a request must be asserted for each transfer demanded by the specified time. This request must be unasserted before the next sampling if another transfer is demanded.

In level mode, after the initial interrupt, all succeeding interrupts are latched on the falling edge of state 4 phase 2 of the system clock. To end a DMA transfer, the interrupt must be unasserted before this falling edge, allowing a set up time for the interrupt signal to become valid. If the request is unasserted after this time, an unwanted DMA transfer will occur.

Local and Global Serial Channels and DMA0

The DMA channels can also be activated by one of the following Local and Global Serial Channel flags RI, TI, RFNE, TFNF, where:
RI—Local Serial Channel receiver buffer is full.
TI—Local Serial Channel transmit buffer is empty.
RFNE—Global Serial Channel Receive FIFO is not empty.
TFNF—Global Serial Channel Transmit FIFO not full.

Details relating to the Local Serial Channel and its flags may be found in the "Microcontroller Handbook" published by Intel Corporation, Order No 210918-004. Details relating to the Global Serial Channel and its flags may be found in co-pending U.S. patent application Ser. No. 012,195 filed Feb. 9, 1987.

After the GO bit is set, the DMA is activated if one of the following conditions take place: Start DMA0 if:
SAR0=SBUF AND RI flag is set, or
DAR0=SBUF AND TI flag is set, or
SAR0=RFIFO AND RFNE flag is set, or
DAR0=TFIFO AND TFNF flag is set,
where SBUF is the Local Serial Channel Buffer in block 25 and RFIFO is the GSC receive FIFO 51 and TFIFO is the GSC transmit FIFO 63.

The same conditions hold for activating DMA1. When the DMA starts, only one byte is transferred at a time. The serial port hardware automatically resets the flag after completion of the transfer. The DMA interrupt (if enabled) is not generated until BCR=0.

When the GO bit is set, the processor executes an instruction before starting the DMA operation.

DMA Timing

Timing diagrams for single-byte DMA transfers are shown in FIGS. 4–7 for four kinds of DMA cycles: internal memory to internal memory, internal memory to external memory, external memory to internal memory, and external memory to external memory. In each case, the processor is assumed to be executing out of external program memory. If the processor is executing out of internal program memory, the PSEN is inactive, and the Port 0 and Port 2 pins emit P0 and P2 Special Function Register (SFR) data, as such term is utilized in INTEL 8051 architecture. If external data memory is accessed, the Port 0 and Port 2 pins are used as the address/data bus, and WR and/or RD signals are generated as needed at Port 2, Pins 6 and 7 respectively.

DMA Priority

DMA0 has priority over DMA1 in case of simultaneous activation of the two channels. If it is required that DMAI takes place before DMA0, the DMA0 GO flag must not be set immediately following the instruction to set the DMA1 GO bit. If this does occur, DMA0 will take over first even though DMA1 was selected first.

DMA Interrupts

There are two vectored interrupts associated with the two DMA channels. When a DMA operation is complete (BCR=0), the DONE flag is set in the respective DCON register. If the DMA interrupt is enabled, upon vectoring to the interrupt routine, the DONE flag is reset automatically.

The interrupts are maskable and have priorities associated with each of them. The interrupt priority scheme is similar to the scheme in the INTEL 8051 microcontroller which utilizes an interrupt enable (IE) and interrupt priority registers. The Interrupt Enable (EDMA0 and EDMA1) and Priority (PDMA0 and PDMA1) bits of the DMA interrupts are located in Interrupt Enable Register 1 (IEN1), and Interrupt Priority Register 1 (IPN1) registers respectively which are part of Interrupt Control block 71. When EDMA0 is set, an interrupt service routine is executed when the DONE bit of DCON0 is set. Similarly, when EDMAI is set, an interrupt service routine is executed when the DONE bit of DCON1 is set. The interrupt service routines are supplied by the user to take desired actions upon completion of the DMA. The two priority bits (PDMA0 and PDMA1) when set cause interrupts EDMA0 and EDMA1 respectively to have a higher priority then an interrupt with a 0 assigned to it in IPN1.

If a burst mode DMA transfer is in progress, the interrupts are not serviced until the DMA transfer is over. Similarly in case of level activated external demand DMA transfer, the interrupts are serviced after completion of the DMA transfer. In case of alternate cycle DMA transfer, if a DMA cycle is in progress, the interrupts are serviced at the end of the DMA cycle. Then DMA cycles and instruction execution cycles occur alternately. In case of transition activated external demand mode or serial port demand mode DMA, the interrupts are serviced at the end of DMA transfer (which is one byte).

DMA Arbitration

As noted above, DMA0 has higher priority over DMA1 in case of simultaneous activation of the DMA's.

Only one of the two DMA channels is active at a time, except when both are configured in the alternate cycle mode. In this case, the DMA cycles and instruction execution cycles occur in the following order:
1. DMA Cycle 0.
2. Instruction execution.
3. DMA Cycle 1.
4. Instruction execution.

If DMA0 is already in the alternate cycle mode and DMA1 is then set in alternate cycle mode, it will take two instruction cycles before DMA1 is activated due to the priority of DMA0. Once DMA1 becomes active in this mode, the execution will follow the above sequence.

Hold/Hold Acknowledge

Two operating modes of Hold/Hold Acknowledge logic are available in DMA control block 39 and either or neither may be invoked by software. In one mode, the processor generates a Hold Request signal and awaits a Hold Acknowledge response from an external device before commencing DMA that involves external RAM. This is called the Requester Mode.

In the other mode, the processor accepts a Hold Request signal from an external device and generates a Hold Acknowledge signal in response, to indicate to the requesting device that the processor will not commence a DMA transfer to or from external RAM while the Hold Request is active. This is called the Arbiter mode.

Requester Mode

The Requester Mode is selected by setting the control bit REQ, which resides in PCON. In that mode, when the processor wants to do a DMA to external data memory, it first generates a Hold Request signal, $\overline{HLD}$, on line 52b indicating that an external bus is needed and waits for a Hold Acknowledge signal, $\overline{HLDA}$ on line 55a indicating that an external bus is available, before commencing the DMA operation. Program execution continues while $\overline{HLDA}$ is awaited. The DMA is not begun until a logical 0 is detected at the $\overline{HLDA}$ pin. Then, once the DMA has begun, it goes to completion regardless of the logic level at $\overline{HLDA}$.

The protocol is activated only for DMAs which access external data memory. If the data destination and source are both internal to the processor, the $\overline{HLD}/\overline{HLDA}$ protocol is not used.

The $\overline{HLD}$ output is an alternate function of port 1 pin 5, and the $\overline{HLDA}$ input is an alternate function of port 1, pin 6.

Arbiter Mode

For DMA transfers that are to be driven by a device other than the processor, a different version of the Hold/Hold Acknowledge protocol is available. In this version, the device which is to drive the DMA sends a Hold Request signal, $\overline{HLD}$, to the processor. If the processor is currently performing a DMA to or from external data memory, it will complete this DMA before responding to the Hold Request. When the processor responds to the Hold Request, it does so by activating a Hold Acknowledge signal, $\overline{HLDA}$. This indicates that the processor will not commence a new DMA to or from external data memory while $\overline{HLD}$ remains active.

In the Arbiter Mode, the processor does not suspend program execution at all, even if it is executing from external program memory. It does not surrender use of its own bus. This version of the Hold/Hold Acknoledge feature is selected by setting the control bit ARB in PCON.

Thus a DMA system utilizing a pair of DMA channels implemented as part of a single chip integrated cirucit microcontroller has been described. Thos skilled in the relevant art will recognize that various changes may be made without departing from the spirit and scope of the invention as defined in the following claims.

We claim:

1. An integrated circuit microcontroller having a bus, an arithmetic logical circuit, a random access memory coupled to said bus, an external memory for coupling to said bus, and at least one port driver for coupling to external devices, said random access memory and said external memory being directly accessible by said external devices through said at least one port driver, said microcontroller comprising:

(a) at least two channels coupled to said bus for directly accessing at least one of said memories to selectively effect the transfer of data from (i) a first portion of said random access memory to a second portion of said random access memory; (ii) a portion of said random access memory to a portion of said external memory; (iii) a portion of said external memory to a portion of said random access memory; and (iv) a first portion of said external memory to a second portion of said external memory;

(b) direct memory access control means coupled to said bus, said at least one port driver and said at least two channels for generating channel control signals for said at least two channels based upon signals on said bus, and said at least one port driver, said channel control signals for controlling the operation of said at least two channels;

wherein each of said channels comprises:
(i) a control register for storing the status of the channel;
(ii) a source address resgister for storing the address of a byte in said internal memory or extgernal memory to be transferred;
(iii) a destination address register for storing the destruction address of a byte in said internal memory or external memory; and
(iv) a byte count register for storing the number of bytes remaining to be transferred by said channel.

2. The microcontroller defined by claim 1 whereas said random access memory includes a plurality of special function registers.

3. The microcontroller defined by claim 1 wherein said direct memory access control means further comprises arbitration logic means for generating $\overline{\text{HLD}}/\overline{\text{HLDA}}$ control signals indicating when a direct memory access channel is active and when a direct memory access transfer to said external memory is requested.

4. The microcontroller defined by claim 3 wherein said direct memory access control means further comprises:
 (a) register control logic coupled to each of said control register, said source address register, said destination address register and said byte count register;
 (b) control register logic means coupled to said register control logic and said arbitration logic for generating register control logic signals and interrupt signals for said microcontroller and for sending indications of a mode of operation of said at least two channels to said arbitration logic means.

* * * * *